United States Patent [15] 3,674,990

Kurauchi et al. [45] July 4, 1972

[54] MOVING OBJECT IDENTIFICATION SYSTEM

[72] Inventors: Noritaka Kurauchi; Shotaro Tada; Hiroshi Shima; Susumu Hiraoka; Taichiro Nagao; Masahiro Koyama; Satoshi Shiraishi; Masuo Shindo; Yoshinobu Kobayshi, all of Osaka, Japan

[73] Assignee: Sumitomo Electric Industries, Ltd., Osaka, Japan

[22] Filed: May 12, 1970

[21] Appl. No.: 36,558

[52] U.S. Cl............235/61.11 E, 235/61.12 N, 340/146.3 K, 250/219 A

[51] Int. Cl...................G06k 7/10, G06k 19/06, E04g 17/00

[58] Field of Search..................235/61.11, 61.115, 61.12 N, 235/61.12 R; 340/146.3 K; 250/219; 40/63, 64, 28, 52

[56] References Cited

UNITED STATES PATENTS

| | | | |
|---|---|---|---|
| 3,225,177 | 12/1965 | Stites et al. | 235/61.11 E |
| 3,525,073 | 8/1970 | Calderon et al. | 235/61.11 E |
| 3,106,706 | 10/1963 | Kolanowski et al. | 340/146.3 K |

*Primary Examiner*—Daryl W. Cook
*Attorney*—Carothers and Carothers

[57] ABSTRACT

An optical electronic system for identification of railway cars. Code plates are attached to each of the railway cars and have a plurality of vertical row arrays of wide and narrow retroreflective strips arranged with respect to each other in accordance with a predetermined alpha-numeric and row code. A light beam narrower than the narrowest retroreflective stripe is vertically scanned over the code plate repeatedly as the railway car moves therepast horizontally in order to scan each of the vertical arrays of stripes and thereby produce a train of reflected light pulses which are then converted to electric pulses and decoded by measuring the pulse widths and intervals.

16 Claims, 22 Drawing Figures

INVENTORS.
NORITAKA KURAUCHI,
SHOTARO TADA,
HIROSHI SHIMA,
SUSUMU HIRAOKA,
TAICHIRO NAGAO,
MASAHIRO KOYAMA,
SATOSHI SHIRAISHI,
MASUO SHINDO &
YOSHINOBU KOBAYASHI

BY
CAROTHERS & CAROTHERS
THEIR ATTORNEYS

INVENTORS.
NORITAKA KURAUCHI,
SHOTARO TADA,
HIROSHI SHIMA,
SUSUMU HIRAOKA,
TAICHIRO NAGAO,
MASAHIRO KOYAMA,
SATOSHI SHIRAISHI,
MASUO SHINDO &
YOSHINOBU KOBAYASHI

BY
CAROTHERS & CAROTHERS
THEIR ATTORNEYS

INVENTORS.
NORITAKA KURAUCHI,
SHOTARO TADA,
HIROSHI SHIMA,
SUSUMU HIRAOKA,
TAICHIRO NAGAO,
MASAHIRO KOYAMA,
SATOSHI SHIRAISHI,
MASUO SHINDO &
YOSHINOBU KOBAYASHI

BY
CAROTHERS & CAROTHERS
THEIR ATTORNEYS

INVENTORS.
NORITAKA KURAUCHI,
SHOTARO TADA,
HIROSHI SHIMA,
SUSUMU HIRAOKA,
TAICHIRO NAGAO,
MASAHIRO KOYAMA,
SATOSHI SHIRAISHI,
MASUO SHINDO &
YOSHINOBU KOBAYASHI

BY
CAROTHERS & CAROTHERS
THEIR ATTORNEYS

INVENTORS.
NORITAKA KURAUCHI,
SHOTARO TADA,
HIROSHI SHIMA,
SUSUMU HIRAOKA,
TAICHIRO NAGAO,
MASAHIRO KOYAMA,
SATOSHI SHIRAISHI,
MASUO SHINDO &
YOSHINOBU KOBAYASHI
BY
CAROTHERS & CAROTHERS
THEIR ATTORNEYS

INVENTORS.
NORITAKA KURAUCHI,
SHOTARO TADA,
HIROSHI SHIMA,
SUSUMU HIRAOKA,
TAICHIRO NAGAO,
MASAHIRO KOYAMA,
SATOSHI SHIRAISHI,
MASUO SHINDO &
YOSHINOBU KOBAYASHI
BY
CAROTHERS & CAROTHERS
THEIR ATTORNEYS

BLOCK DIAGRAM OF PROCESSOR

INVENTORS.
NORITAKA KURAUCHI,
SHOTARO TADA,
HIROSHI SHIMA,
SUSUMU HIRAOKA,
TAICHIRO NAGAO,
MASAHIRO KOYAMA,
SATOSHI SHIRAISHI,
MASUO SHINDO &
YOSHINOBU KOBAYASHI

BY
CAROTHERS & CAROTHERS
THEIR ATTORNEYS

TIME CHART OF PROCESSOR

INVENTORS.
NORITAKA KURAUCHI,
SHOTARO TADA,
HIROSHI SHIMA,
SUSUMU HIRAOKA,
TAICHIRO NAGAO,
MASAHIRO KOYAMA,
SATOSHI SHIRAISHI,
MASUO SHINDO &
YOSHINOBU KOBAYASHI

BY
CAROTHERS & CAROTHERS
THEIR ATTORNEYS

MOVING OBJECT IDENTIFICATION SYSTEM

This invention relates to a code plate which expresses the attribute of a moving object, an optical to electronic transducer to read such a code plate, and an apparatus for processing information from the code plate, for identifying objects in motion.

A number of systems for automatically reading the number of an object in motion — for example, a freight car — have already been proposed and some of them are in practical use. A most typical one of such systems is one in which a code plate expressing the attribute of an object by use of retroreflective stripes in three colors is opto-electronicaly read. It is taught by U.S. Pat. No. 3,225,177, patented Dec. 21, 1965, entitled "-Mark Sensing."

The present invention relates to a new system which is free from the shortcomings of such systems already proffered.

The system heretofore proffered — the system of the afore-mentioned U.S. Pat. No. 3,225,177 — has the following shortcomings.

1. The code plate affixed to an object consists of a vertical array of retroreflective stripes. If the volume of information on the attribute of an object to be expressed becomes large — for example, if the number of an object has many figures — the vertical array of retroreflective stripes of the code plate has to be a long one. In this case, (1) the dimensions of the code plate make it difficult to find a suitable place on the object for its installation, and (2) the vertical region where the code plate is scanned and read becomes large, which is a problem technically difficult to solve.

2. The light source illuminates the large region of the code plate and a restrictive mask is provided in order to receive the reflected light from only one of the retroreflective stripes which compose the code plate. That is to say, if the optical system is viewed to divide into the light projecting side and the light receiving side, the function to focus on each individual stripe on the code plate is assigned to the light receiving side. Notwithstanding that the light source illuminates a large region on the code plate, only a very small portion of the reflected light is effectively received at any one time, so that a greater part of the light source energy projected is wasted.

3. The information of the code plate is made up of the combination of colors of the retroreflective stripes. Colors sometimes change owing to severe soiling. For example, all such colors as blue, white, etc. become reddish if such red-brownish dust as iron dust sticks to them. This may lead to an erroneous identification of the color and a mistake in reading the information.

4. The information units required for expressing the attribute of objects — for instance, the decimal numbers 0 to 9 and the letters of the alphabet — are made up of combinations of colors in accordance with a predetermined code. When affixing a code plate to an object, it is necessary to have a large number of such information units on hand, so that a code plate can be assigned to the object no matter what number the object may have. Moreover, the errors occur in combining information units together.

5. When it is required to change the information expressing the attribute of an object — for example, when it is wanted to express variable information such as train number, load, destination, weight, etc. — the system heretofore in use is very inconvenient. It is uneconomical if new color stripes are pasted on each time such a requirement occurs.

A first objective of the present invention is to provide an optical electronic system which represents improvement with respect to the afore-mentioned shortcomings of the system heretofore in use. Another object is to provide, in this improved optical electronic system, an improved code plate, an apparatus focusing the light beam on the code plate, and a data processing sub-system which processes the code plate information which has been read.

Figure 2:
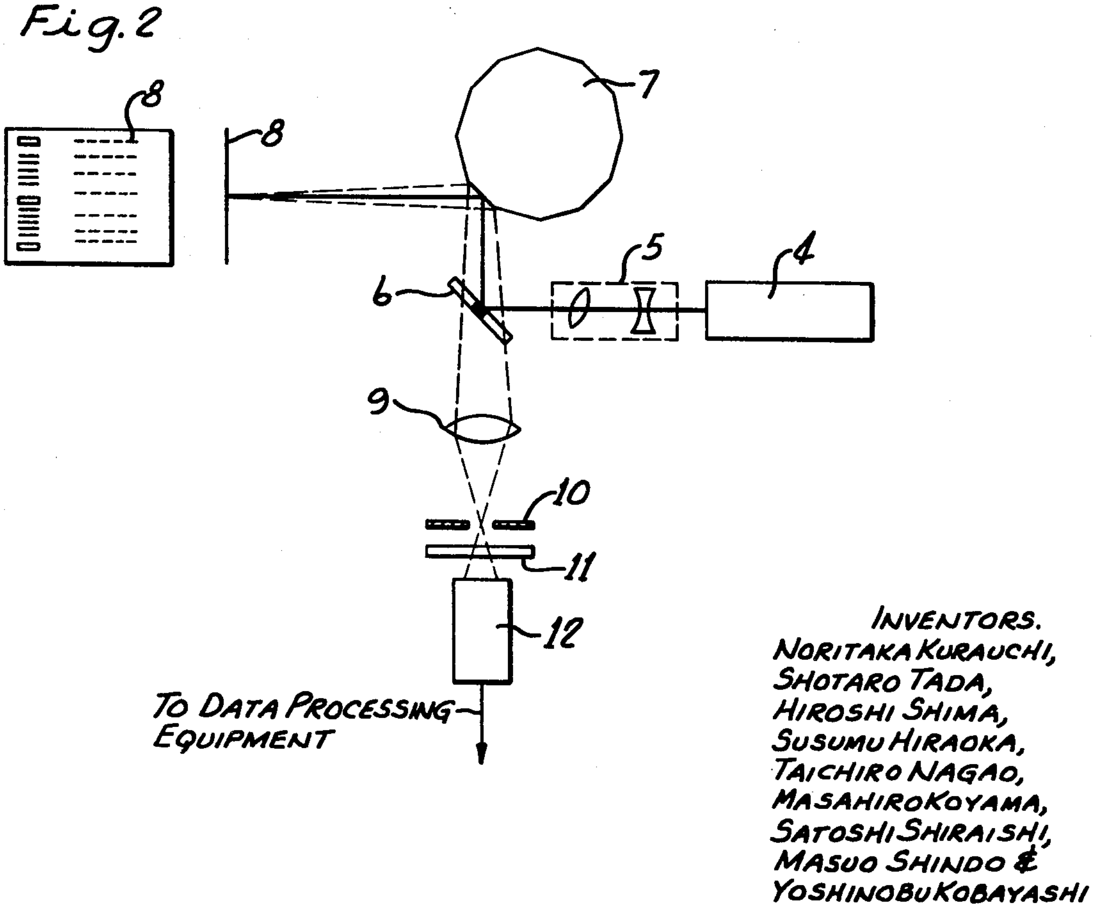
FIG. 2 is a diagram of the optical subsystem of the system shown in FIG. 1.
Figure 3A:
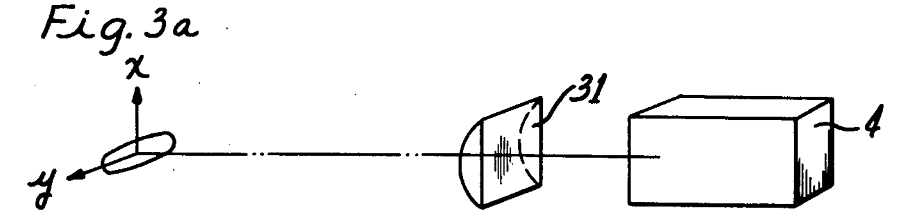
Figure 3B:
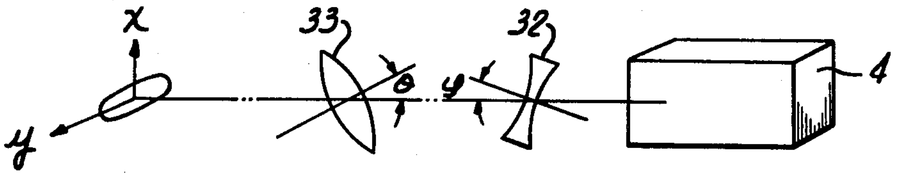
Figure 3C:
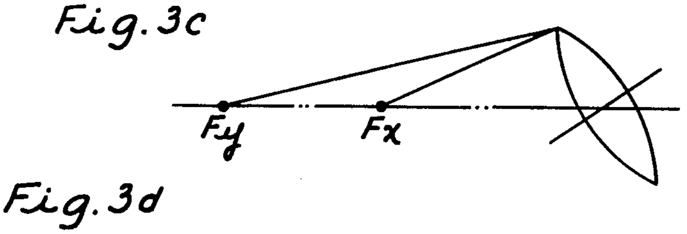
Figure 3D:
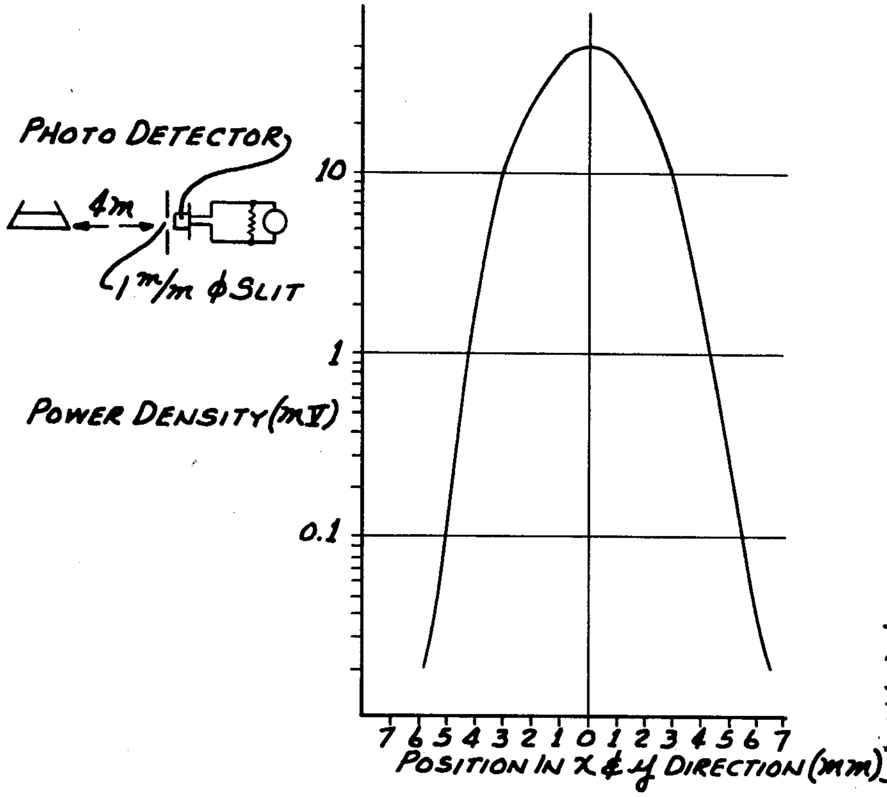
Figure 3E:
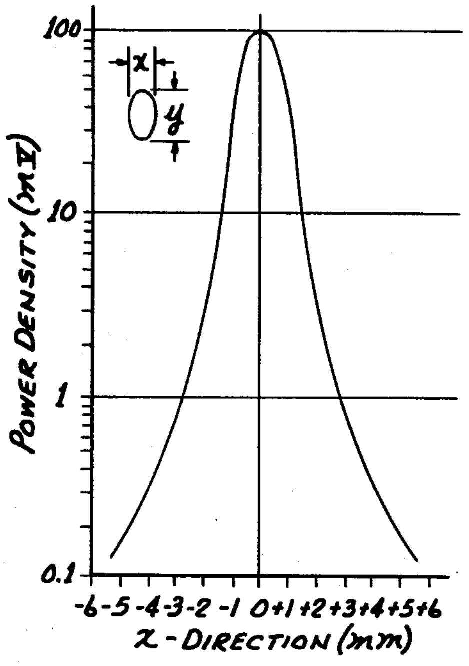
Figure 3F:
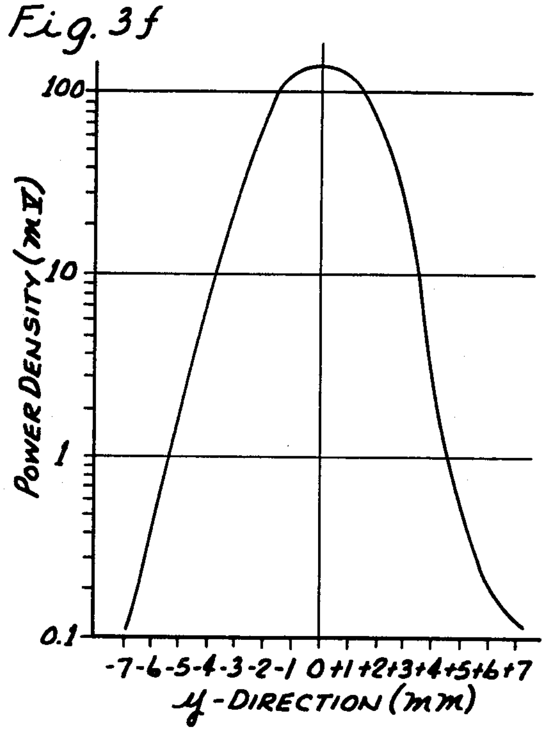
Figure 3G:
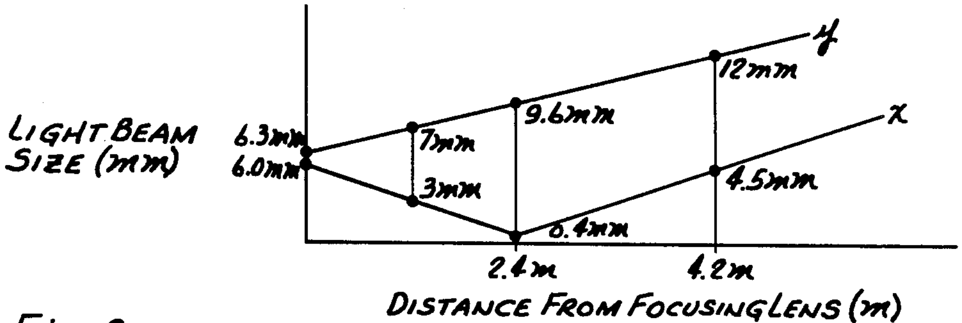

FIG. 3 (*a*) and 3 (*b*) are diagrammatic illustrations of the principle of the apparatus for focusing the light beam on the code plate in the subsystem shown in FIG. 2.

FIG. 3 (*c*) is a diagrammatic illustration explanatory of the astigmatism of the lens of said light beam focusing apparatus.

FIGS. 3 (*d*), (*e*), (*f*), and (*g*) are graphic illustrations giving the results of the measurement of the power density distributions obtained by the light beam focusing apparatus of this invention and the results of the calculation of beam size.

Figure 4A:
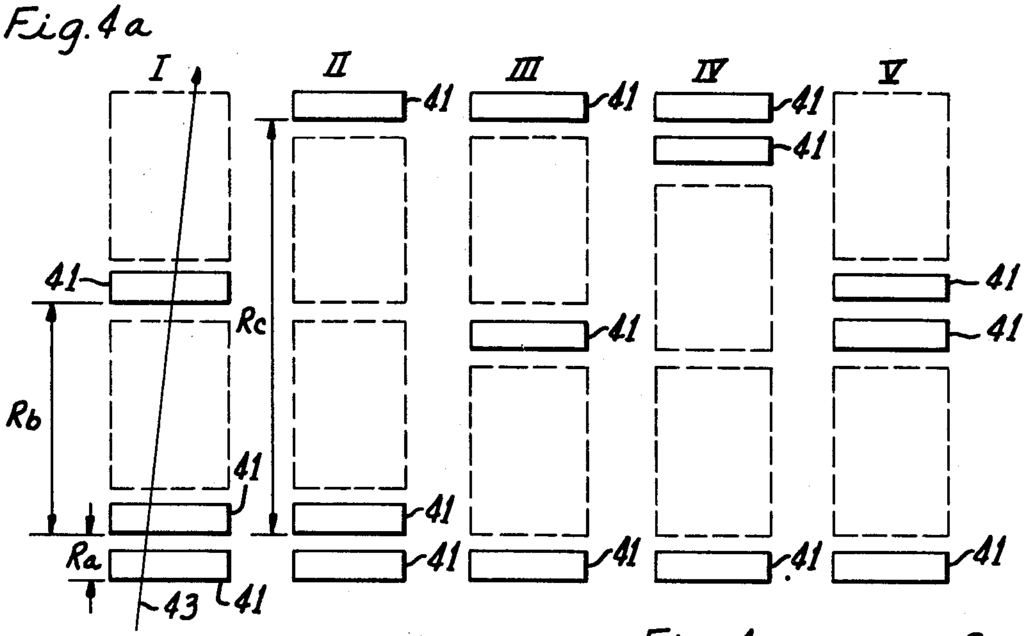
Figure 4B:
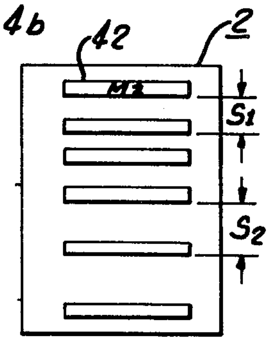

FIGS. 4 (*a*) and 4 (*b*) show examples of a pattern of a code plate of this invention.

Figure 5:
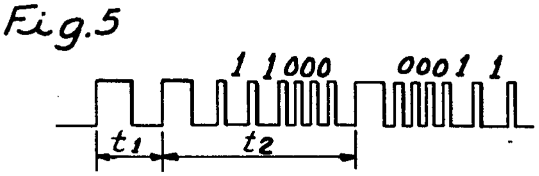

FIG. 5 graphically shows an example of the train of pulses obtained by scanning on the pattern of the code plate of FIG. 4 in the optical subsystem shown in FIG. 2.

Figure 6:
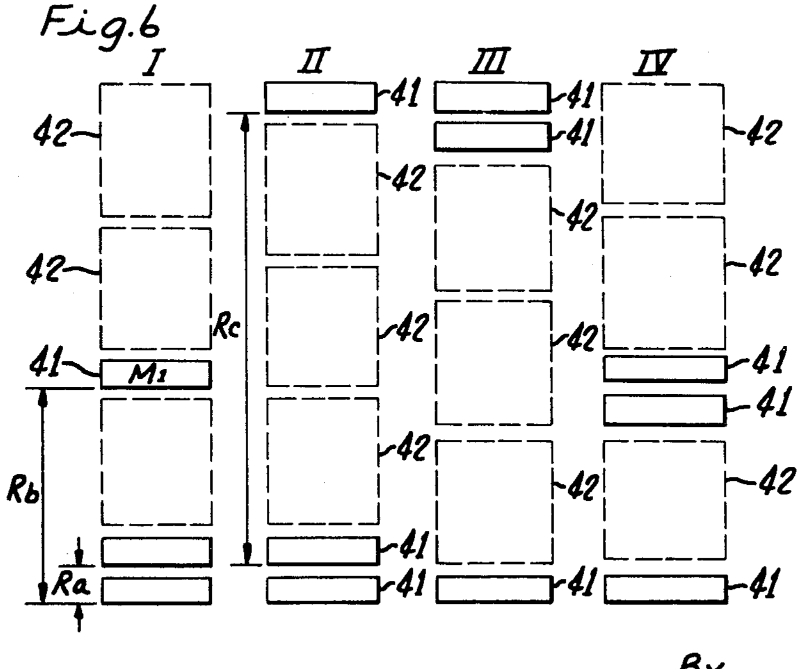

FIG. 6 is similar to FIG. 4 and shows another example of a pattern for a code plate of this invention.

Figure 7A:
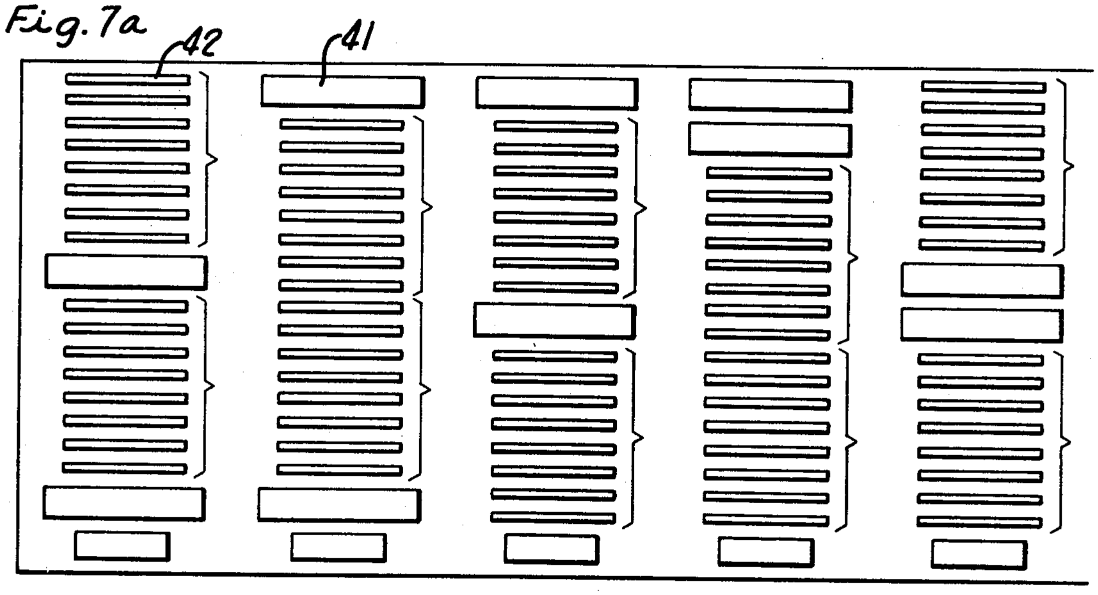
Figures 7B, 9B:
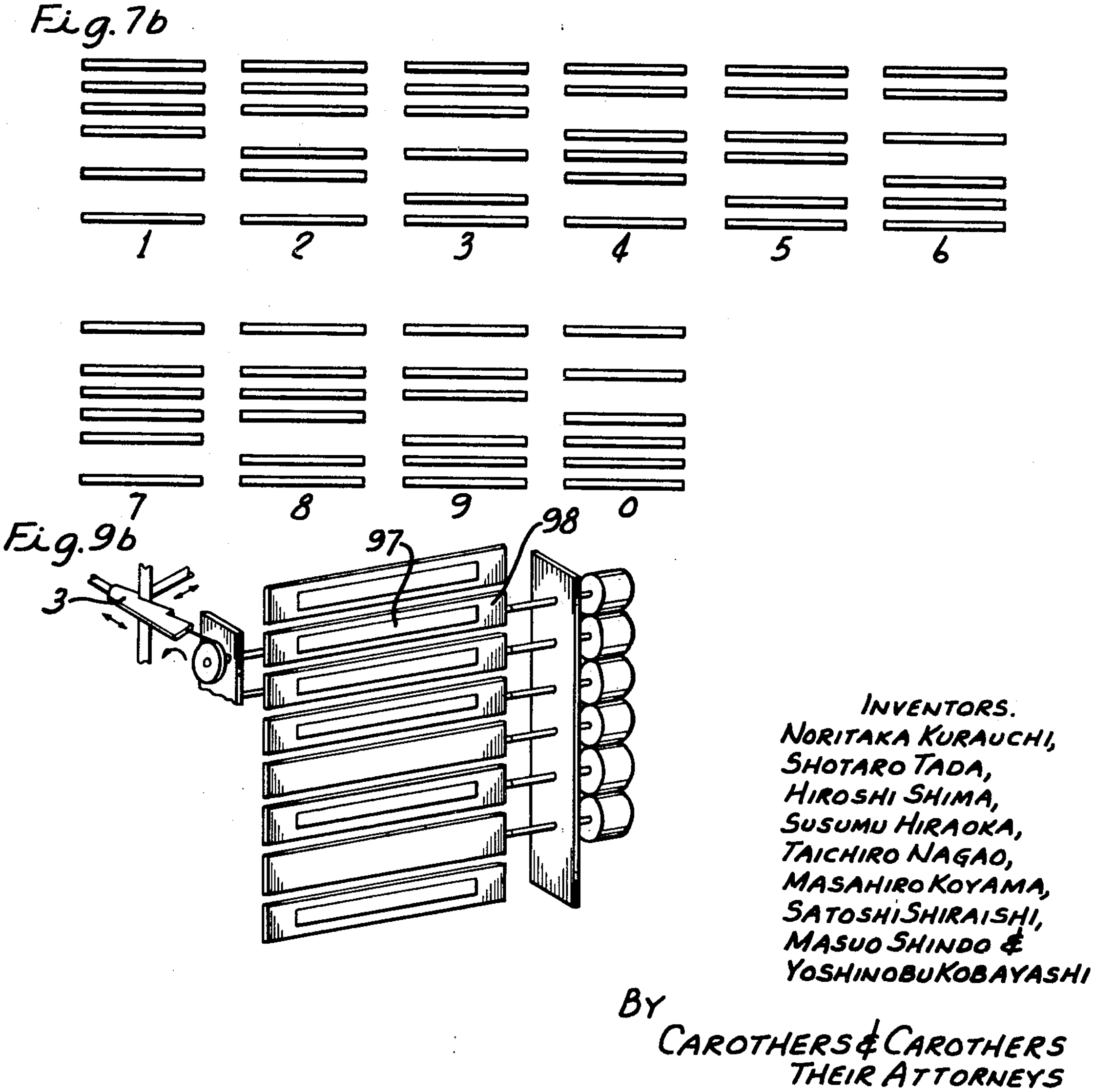

FIGS. 7 (*a*) and 7(*b*) diagrammatically show the pattern of a "code plate base" common to all objects, on the basis of which the code plate of FIG. 4 is fabricated.

Figure 8A:
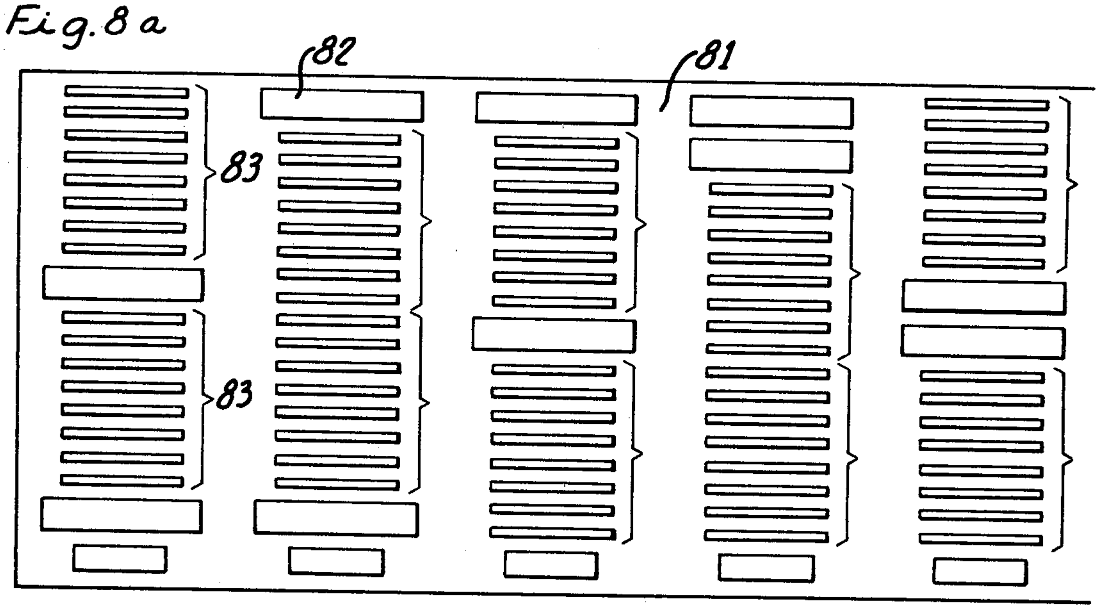
Figure 8B:
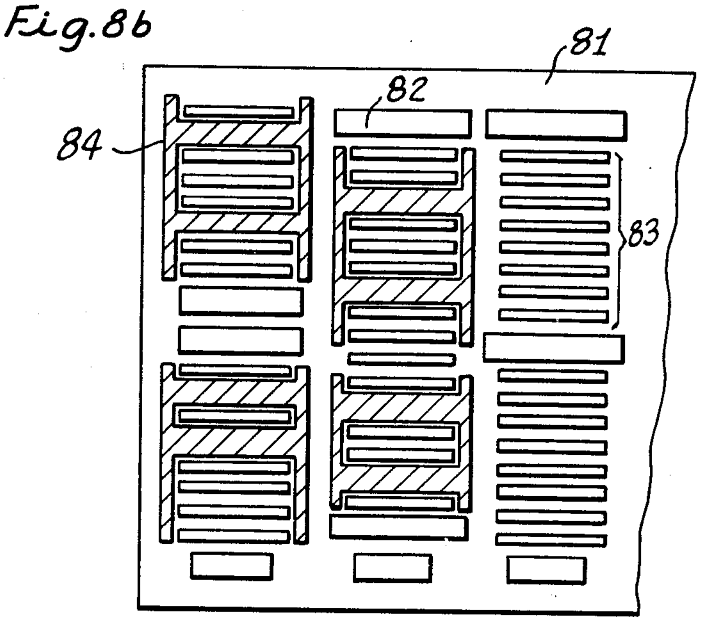
Figure 8C:
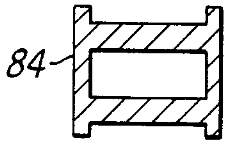

FIGS. 8 (*a*), (*b*) and (*c*) show a variable code plate which consists of a "code plate base" used for expressing the code of FIG. 4 and a "mask plate" which masks said base.

Figure 9A:
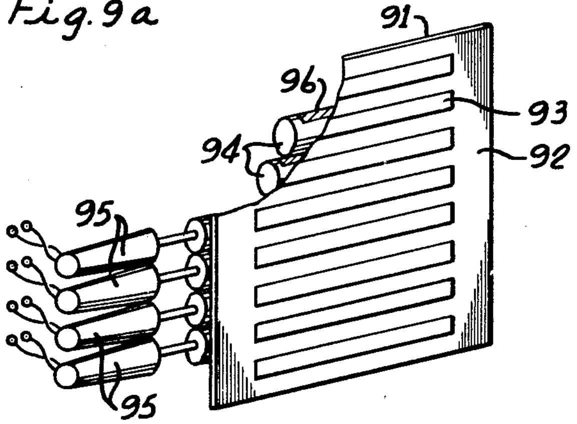

FIGS. 9 (*a*) and 9 (*b*) are perspective views illustrating a variable code plate comprising revolving cylindrical elements used to express the code of FIG. 4 (*b*).

Figure 1:
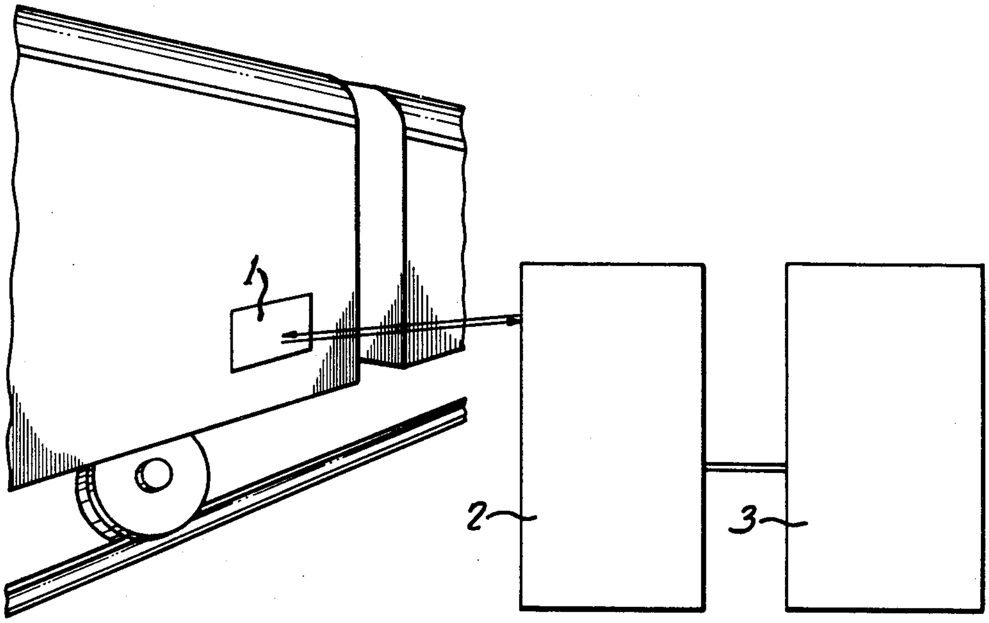
FIG. 1 is a diagram showing a moving object having a code plate expressing the attribute of the object to which it is attached and a system for reading it.
Figure 10A:
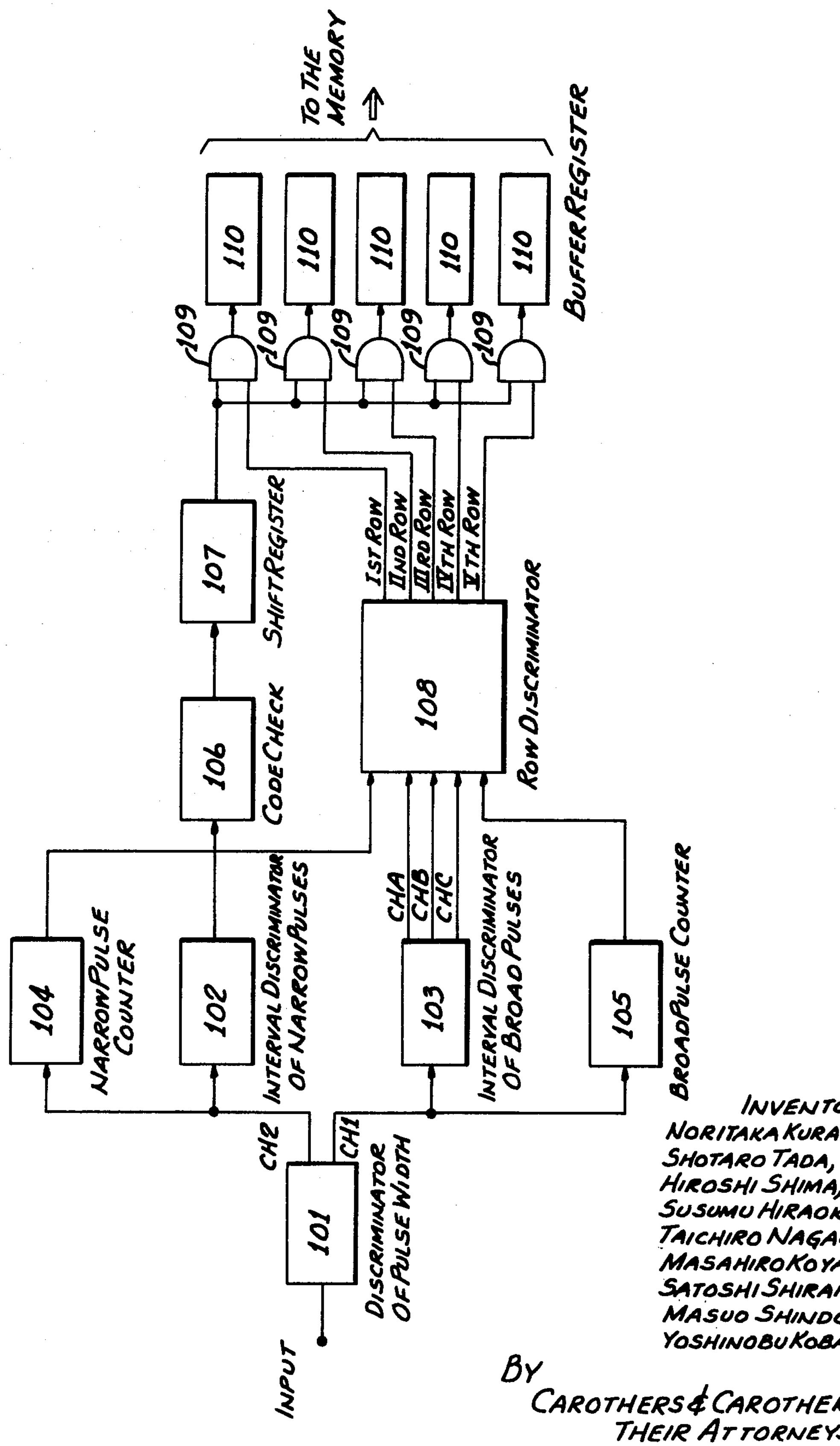
Figure 10B:
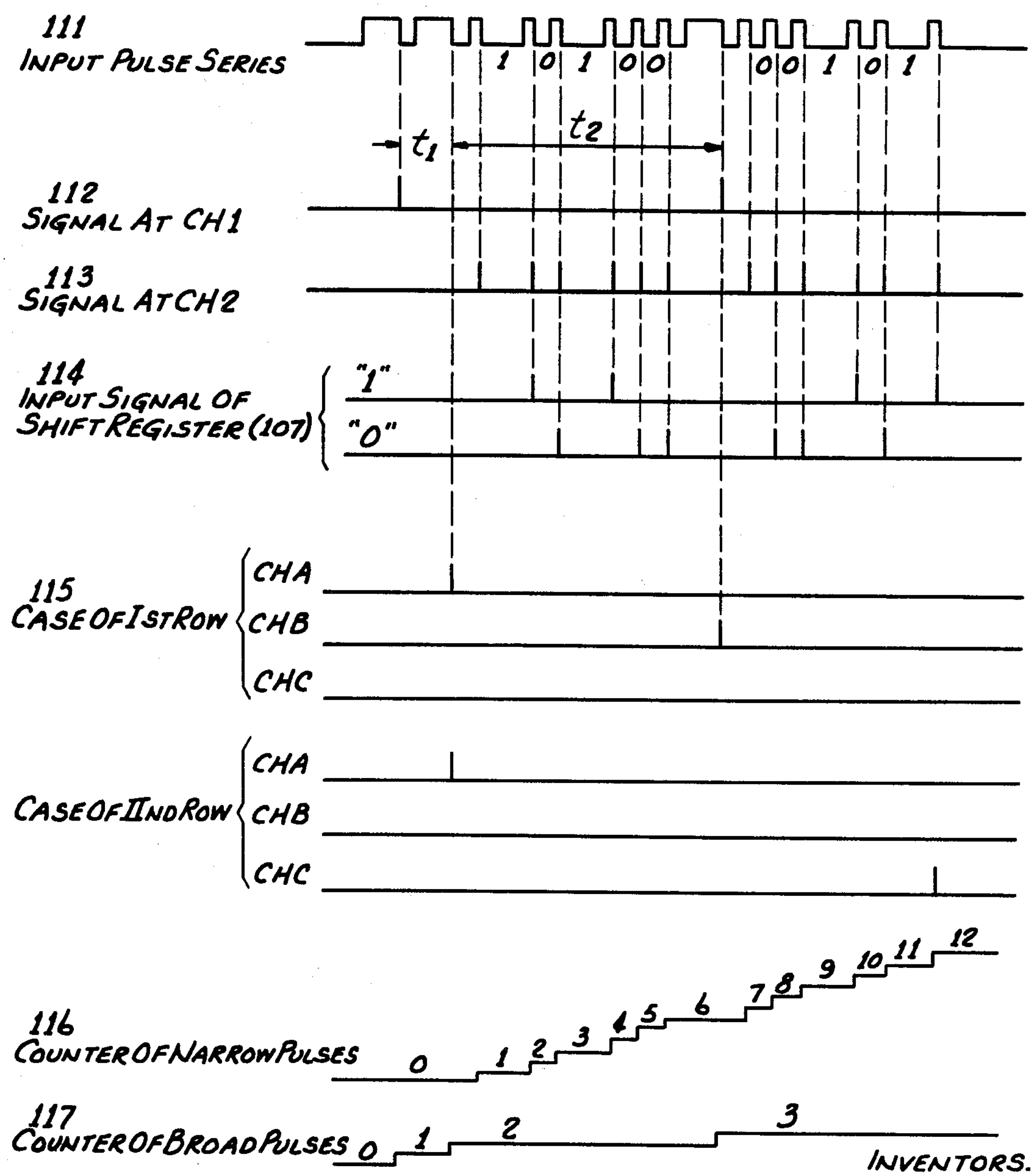

FIG. 10 (*a*) is a block diagram of the data processing subsystem in the system of FIG. 1.

FIG. 10 (*b*) is a series of graphical illustrations showing pulse trains obtained by optical scanning of the code plate of FIG. 4 and time-charts of pulses obtained at each stage when processing these pulse trains in accordance with the block diagram of FIG. 10 (*a*).

GENERAL DESCRIPTION

The system shown in FIG. 1 consists of a code plate 1 which is attached to an object moving along a predetermined route and expresses the attribute of the object optically to optical-to-electronic transducer 2 which has the functions of projecting a light beam to said code plate for scanning, of receiving the reflected light from the code plate and of converting the energy of the reflected light into electric signals, and data processing equipment 3 which processes the electric signals obtained from said optical-to-electronic transducer.

FIG. 2 is provided to explain in more detail the optical-to-electronic transducer 2 shown in FIG. 1. In FIG. 2, 4 denotes a light source such as a laser, mercury lamp, sodium lamp, etc., and 5 denotes a lens which focuses the light energy from the light source 4 at the location of the code plate on the object — this lens is one of the important constituents of the present invention and will be described later in detail. Reference numeral 6 denotes a partially reflective mirror which separates the light from the light source 4 and the return light reflected from the code plate. A small central part of this mirror has a reflection coefficient of almost 100 percent, while its peripheral part has transparency of almost 100 percent. The light from the source is reflected by the central part of said mirror, and the return light reflected from the code plate passes through the peripheral part. Reference numeral 7 denotes a rotating mirror which sends the light beam onto the code plate for vertical scanning. Reference numeral 8 denotes a code plate attached on a side of a moving object, which is made up of retroreflective stripes in one color. A retroreflective sheet has the property of reflecting light in the direction of its incidence. Reference numeral 9 denotes a collecting lens which receives the return light and condenses it to a point. Reference numeral 10 denotes a mask placed at the location of the focus of said collecting lens for the purpose of shielding out sun light and other disturbance. The mask has a slit in its central part, and the light beam condensed at the location of the focus passes through this slit. Reference numeral 11 denotes an optical filter which transmits only the spectrum of the light source 4 in order to shield out disturbance like sun light. Reference numeral 12 denotes an opto-electronic sensitive device which converts into electric energy the energy of light reflected from the retroreflective stripes of the code plate which has come through said collecting lens 9, said mask 10 and said optical filter 11.

In the system comprising the elements 4 – 12 as mentioned above, the rotating mirror 7 revolves to scan a light beam on the code plate and an electronic pulse series in accordance with the pattern of the code plate is supplied to the data processing equipment 3 as the output signals of the opto-electronic sensitive device 12.

LIGHT BEAM FOCUSING

In the system of this invention, what is greatly different from the system heretofore in use and is highly effective is the lens focusing the beam from light source 5.

This focusing lens condenses the energy of the light source to a very thin region on the code plate, so that the light energy can be utilized effectively. A very bright spot can be obtained with a light source having little power. Furthermore, it is possible to obtain a high resolvability by shaping the light beam to an elliptic or rectangular form which is thinner than the vertical width of a stripe of the pattern of the code plate, and which is about as long as the horizontal length of the stripes. Moreover, since the whole area of a stripe element is fully utilized by forming the light beam to the afore-mentioned shape, the volume of reflected light is stabilized even when a part of the stripe is soiled or broken.

A concrete means for realizing the above-mentioned advantages is described with reference to FIG. 3.

In FIG. 3 (*a*), 4 is the light source and 31 is a cylindrical lens, which has curvature in the vertical direction (the direction of the X-axis) and is uniform in the horizontal direction (the direction of the Y-axis). This lens has a beam condensing effect in the X-axis direction, at the position of the code plate, while it has no beam condensing effect in the direction of the Y-axis, so that the beam from the light source diverges and becomes at light beam extended in the horizontal direction (in the direction of the Y-axis) at the position of the code plate.

In FIG. 3 (*b*), 4 is the light source, 32 a concave lens and 33 a convex lens, one or both of the lenses being inclined against the axis of the beam. The inclination of the lens gives rise to astigmatism. As shown in FIG. 3 (*c*), the focal distance $Fx$ in the plane of the X-axis and the beam axis and the focal distance $Fy$ in the plane of the Y-axis and the beam axis may be expressed as follows:

$$F_x = \frac{R}{\sqrt{n^2 - \sin^2\theta} - \cos\theta}$$

$$F_y = \frac{R\cos^2\theta}{\sqrt{n^2 - \sin^2\theta} - \cos\theta}$$

Where $R$: curvature of the lense $n$: index of refraction of the lens $\theta$: angle of inclination of the lens against the beam axis.

It is possible to have one focus ($Fx$ or $Fy$) fall on the location of the code plate and the other focus ($Fy$ or $Fx$) not fall on the location, focusing the light beam in one direction and diverging it in the other direction.

Compared with a single lens which is inclined, a combination of a concave lens 32 and a convex lens 33 as shown in FIG. 3 (*b*) has a feature that it is easier to obtain a desirable shape of beam size at any desirable location.

FIG. 3 (*d*) shows an example of measurement results of power density distribution at the location of the code plate, with a He-Ne gas laser used as the light source 4 and without a focusing lens in use.

FIG. 3 (*e*) shows an example of measurement results of power density distribution of the light beam in the X-axis direction (vertical direction) at the location of the code plate, with the same He-Ne gas laser as the light source 4 and with the composite focusing lens shown in FIG. 3 (*b*) in use.

FIG. 3 (*f*) shows an example of measurement results of power density distribution of the light beam in the Y-axis direction (horizontal direction) at the location of the code plate, with the same He-Ne gas laser as the light source 4 and with the composite focusing lens shown in FIG. 3 (*b*) in use.

By comparing FIG. 3 (*d*) with FIG. 3 (*e*) and 3 (*f*), the effect of the present invention can be clearly seen.

FIG. 3 (*g*) gives an example of results of calculation to show how the X-axis and Y-axis sizes of the light beam through the composite focusing lens shown in FIG. 3 (*b*) change according to the distance from the focusing lens. In that Figure it is shown that a beam size of 0.4 mm in the X-axis direction and 9.6 mm in the Y-axis direction is obtained at a location 2.4 m distant from the focusing lens.

CODE PLATE

In the system heretofore in use, the code plate to be attached to the object consisted of only a vertical array or row of reflective stripes, each stripe being made up of a combination of two colors among four colors including black and representing one decimal number. If the number assigned to the object has many figures, therefore, the vertical length of the array becomes long, so that disadvantages occur such that it becomes difficult to attach the code plate to the object and the scanning range of the light beam becomes broad and calls for a large revolving mirror. In addition, information on colors is unstable with respect to soilage (for example, red brownish soils due to iron dust, soilage of blue paint, etc.)

The code plate of this invention represents an improvement over these shortcomings.

FIGS. 4 (*a*) and 4 (*b*) show a pattern of the code plate according to this invention.

FIG. 4 shows an instance where 10 figures are placed in five horizontal arrays of two figures each, two figures being arrayed vertically. FIG. 4 (*a*) shows a code plate with figures arrayed as units, and FIG. 4 (*b*) shows an example of a numeral code having a decimal number encoded in binary codes. A code plate is made up of two kinds of widths of reflective stripes 41 and 42 and a non-reflective part. The two kinds of retroreflective stripes are broad width marks 41 having a width $M_1$ and narrow width marks 42 having a width $M_2$. The part shown with broken lines in FIG. 4 (*a*) is an area wherein the numeral code shown in FIG. 4 (*b*) is inserted. In this example of FIG. 4 (*b*), six pieces of narrow width marks 42 are placed with either spaces $S_1$ or $S_2$ to correspond to 0 and 1 to represent a decimal number by binary codes.

By combining the positions of 3 pieces of broad width marks 41, five kinds of rows,—five different vertical arrays positioned side by side — I, II, III, IV and V, are differentiated. The arrow in the row I shows the direction of optical scanning.

In the row I, in accordance with the direction of scanning, the space between the first broad width mark and the second broad width mark is R*a*, the space between the second broad width mark and the third broad width mark is R*b*, and in row II such spaces are R*a*, and R*c*, in row III R*b* and R*b*, in row IV R*c* and R*a* and in row V R*b* and R*a*. By scanning on such a code plate, a pulse series consisting of a combination of broad width pulses and narrow width pulses as shown in FIG. 5 is obtained corresponding to the broad width marks and narrow width marks of the reflective element. This pulse series is fed as an input to the data processing equipment 3 to find out what row the light beam has been scanned on and what its numerical contents are.

A time interval of the adjacent broad width pulses corresponds to any one of three intervals, R*a*, R*b*, and R*c*. In FIG. 5, when the light beam scans the row or vertical row array I for instance, the time intervals $t_1$ and $t_2$ of the adjacent broad width pulses correspond to the intervals R$a$ and R$b$ respectively. The time interval of the narrow width pulses correspond to the intervals $S_1$ and $S_2$ of the narrow width marks. When in the code processing circuits, the broad width pulse intervals $t_1$ and $t_2$ are compared with two threshold values $\tau_a$ and $\tau_b$ which have previously been set. The results are shown in Table 1. By comparing the broad width pulse intervals $t_1$ and $t_2$ with the threshold values $\tau a$ and $\tau b$, each row can be identified as shown in Table 1.

TABLE 1

| Row | Relations for Identification |
|---|---|
| I | $t_1<\tau a<t_2<\tau b$ |
| II | $t_1<\tau a$ , $\tau b<t_2$ |
| III | $\tau a<t_1$ , $t_2<\tau b$ |
| IV | $t_2<\tau a$ , $\tau b<t_1$ |
| V | $t_2<\tau a$ , $t_1<\tau b$ |

Furthermore, it is also possible to identify a row by the number of narrow width marks 42 of the numeral code interposed between two adjacent broad width marks 41. Table 2 shows how many narrow width marks exist before the scanning of the first broad width mark, how many narrow width marks exist before the scanning of the second broad width mark and how many narrow width marks exist before the scanning of the third broad width mark when three pieces of broad width marks 41 are scanned by light from one fixed direction.

TABLE 2

| Row / Broad width mark | I | II | III | IV | V |
|---|---|---|---|---|---|
| 1 | 0 | 0 | 0 | 0 | 0 |
| 2 | 0 | 0 | 6 | 12 | 6 |
| 3 | 6 | 12 | 12 | 12 | 6 |

As is shown by Table 2, each row can be indentified by a fixed series of pulses.

Another example of the pattern of a code plate of this invention is described below. FIG. 6 shows an instance where a number of 12 figures is divided in four rows. As in the case of FIG. 4, rows can be identified by the combinations of the locations of three pieces of broad width marks 41 and the number of narrow width marks 42 of numeral codes interposed between two adjacent broad width marks 41. Table 3 shows the relationships of the positions of the broad width marks for the identification of rows. $t_1$ and $t_2$ are the pulse time intervals between adjacent ones of three broad width marks, and $\tau a$ and $\tau b$ are two predetermined threshold values.

TABLE 3

| Row | Relations for Identification |
|---|---|
| I | $t_1<\tau a<t_2<\tau b$ |
| II | $t_1<\tau a$ , $b<t_2$ |
| III | $t_2<\tau a$ , $b<t_1$ |
| IV | $t_2<\tau a<t_1<\tau b$ |

Table 4 shows the number of narrow width marks 42 of the numeral code interposed between two adjacent broad width marks for the identification of rows.

TABLE 4

| Row / Broad width mark | I | II | III | IV |
|---|---|---|---|---|
| 1 | 0 | 0 | 0 | 0 |
| 2 | 0 | 0 | 18 | 6 |
| 3 | 6 | 18 | 18 | 6 |

It is also within the scope of this invention to employ concurrently the two methods of identification, namely the mathod of identification by the combination of broad width mark intervals and the method of identification by the number of narrow width marks interposed between adjacent broad width marks.

Embodiments of this invention using three pieces of broad width marks and six pieces of narrow width marks have been described. It is, however, quite evident that a still larger number of figures and letters can be expressed by the use of larger numbers of broad width marks and narrow width marks.

In FIG. 4 ($b$), a numeral code is composed of six pieces of narrow width marks, namely five narrow-width mark intervals. Of the five narrow-width mark intervals, two intervals $S_2$ are long and correspond to "1" of the binary code, and three intervals $S_1$ are short and correspond to "0" of the binary code. When a decimal code is made with five bits in the rule of 2 out of 5, the size of each decimal number code becomes all the same. In addition, error reading of even one bit can be checked. The code is thus made highly reliable.

When providing an object with a code plate, it is sometimes found necessary to assemble a code plate of a number on the spot in accordance with the specific number of the object indicating, for example, the type of the freight car, freight car number, car owner's code, etc. When the number of a freight car is unknown before it is to arrive, it is necessary to be prepared for the assembling of the code plate, no matter whether a freight car of what number may arrive. It is also necessary to try to eliminate the possibility of the code plate assembler making a mistake.

An object of this invention is to provide a code plate which can be made up immediately and in a simple way at any place outdoors on indoors, no matter what number may come, and which minimizes the possibility of human error.

FIG. 7 ($a$) shows the pattern of a "code plate base or master pattern" common to all objects, which serves as a base for making the code plate shown in FIG. 4.

In FIG. 7 ($a$), as in FIG. 4, 41 denotes broad width marks and 42 narrow width marks.

A unit which expresses one decimal number is made up of eight pieces of narrow width marks 42. The distances between adjacent narrow width marks are approximately equal.

A whole code plate is made by arraying suitable numbers of such units vertically and horizontally.

The pattern of the code plate base shown in FIG. 7 ($a$) is made by printing the whole area of a retroreflective sheet with black intransparent ink except for the parts of the broad width marks 41 and narrow width marks 42, or by pasting retroreflective stripes of broad width marks and narrow width marks onto a black non-reflective sheet.

This pattern may be prepared by either of the above-mentioned methods or by another method.

On the other hand, the numbers 0–9 are expressed by patterns as shown in FIG. 7 ($b$). In consequence, one decimal number shown in FIG. 7 ($b$) can be expressed by deleting two of the eight narrow width marks of said unit shown in FIG. 7 ($a$).

As to the actual way to delete two narrow width marks, black tapes may be pasted over the narrow width marks, or narrow width marks may be smeared out with black ink.

As stated above, a code plate of whatever number can be made merely with the pattern of FIG. 7 ($a$) common to all objects and black tapes or black ink. There are few different kinds of things which have to be made ready beforehand, and it is simple to build up any given number.

The simple way of assembling a code plate according to this invention is not limited to the pattern of FIG. 7 ($a$) or to the 2 out of 5 code of FIG. 7 ($b$), but is generally applicable to all code plates expressing information by the combination of intervals of retroreflective stripes in one color.

Next, variable code plates will be explained.

It is required that not only a constant item of information such as a freight car number be expressed, but also that variable items of information such as a train diagram number, destination, load, weight, etc. should be expressed by a code plate. If a costly retroreflective code plate is newly installed every time such a requirement occurs, it is very uneconomical, takes time and is liable to give rise to an error.

If a variable code plate according to this invention is used, it is possible to make up a code plate with new contents of information in a quick, accurate and uncostly way when information in regard to the object has changed.

FIG. 8 (*a*), like FIG. 7 (*a*), shows a "code plate base" common to all objects. In FIG. 8 (*a*), 81 denotes the code plate base, 82 denotes retroreflective stripes which make up the code plate base and 83 denotes a code unit comprised of said retroreflective stripes and having constant intervals for encoding each unit of letters, numbers, etc. to express the information of the object. (In the example shown in this Figure, a code unit is composed of eight pieces of stripes.)

In FIG. 8 (*c*), 84 denotes a mask. The mask is provided with slots so that, when placed over the unit shown in FIG. 8 (*a*), it exposes six stripes out of the eight stripes and masks two stripes.

The mask 84 is for masking a unit individually. However, a mask which masks a plurality of units is also another embodiment of this invention.

As stated above, if a mask prepared by making shots in a light shielding material such as intransparent paper or plastic or a mask prepared by applying a light-shielding substance such as black paint onto a transparent plate is placed over an individual unit or over a plurality of units of retroreflective code plate base, the contents of information can be changed merely by changing the mask.

Now, another type of variable code plate according to the present invention will be described.

In FIG. 9 (*a*), 91 denotes a code plate base, 92 a non-reflective black plate, 93 a rectangular slot made in the variable code plate, 94 a rotatable cylinder which is placed in parallel to the slot 93, 95 a drive mechanism (for example a rotary solenoid) for revolving the cylinder 94, and 96 a retroreflective strip pasted on a part of the surface of the cylinder 93 in parallel to the slot 93.

Usually the cylinders 94 are in such a position that their retroreflective part is positioned just behind the slots 93 such that they are exposed. However, if the torque is applied by some of the drive mechanisms 95, the cylinders 94 connected to their drive mechanisms revolve and their retroreflective portions are hidden from the slots 93 of the base, the code plate 91 being thereby put in an encoded state. In case the code plate is to be encoded for different information, the drive mechanisms are de-energized and other drive mechanisms corresponding to the new information are energized. In the example of embodiment shown in FIG. 9 (*a*), there are six revolving cylinders placed at equal intervals, slots in the base corresponding to the revolving cylinders, one retroreflective stripe at the top on the code plate base, and one retroreflective stripe at the bottom on the base. By turning two of the six cylinders which are not adjacent to each other to shield off the retroreflective parts, it is possible to construct a 2 out of 5 code as shown in FIG. 7 (*b*). It is possible to encode 0, 1, 2 ..... 9 by this code plate. FIG. 9 (*b*) shows another embodiment of this invention. Here flat plates 98 having a retroreflective element 97 pasted on one side are used in place of the revolving cylinder 94 of FIG. 9 (*a*).

DATA PROCESSING

It is also within the scope of this invention to provide a means for processing the reflected light pulse series obtained by scanning on the code plate mentioned in the preceding chapter.

In FIG. 1, a pulse series is obtained as the output signal of the optical-to-electronic transducer 2, and this output signal is supplied to the data processing equipment 3. This output signal is amplified by means of an ordinary amplifier, and, after it is shaped to accurate rectangular pulses, it supplied to the input terminal of the block diagram of FIG. 10 (*a*).

In FIG. 10 (*a*), 101 is a discriminator of pulse width which measures pulse width and discriminate between broad width pulses and narrow width pulses to separate them to channel 1 and channel 2. Reference numeral 102 indicates an interval discriminator of narrow width pulses which is connected to said discriminator of pulse width 101. Discriminator 102 measures the intervals between adjacent narrow width pulses and judges it to be binary code "1" if the interval is long and to be binary code "0" if it is short. Interval discriminator 103 of broad width pulses is connected to said discriminator of pulse width 101, measures the intervals between adjacent broad width pulses, and issures that a signal is sent to Channel A if the interval is smaller than a given fixed threshold value $\tau a$, to Channel B if it is greater than said threshold value $\tau a$ but is smaller than another fixed threshold value $\tau b$, and to Channel C if it is greater than said threshold value $\tau b$ ( $\tau < \tau b$ ). Narrow width pulse counter 104 is connected to said discriminator of pulse width 101 and counts the number of narrow width pulses. Reference numeral 105 designates the broad width pulse counter which is connected to said discriminator of pulse width 101 and counts the number of broad width pulses. Code check circuit 106 is provided for checking said 2-out-of-5 code. Reference numeral 107 designates the shift register which is connected to said code check circuit 106 and stores one after another of the output signals — binary code "1" or "0" — of said interval discriminator of narrow width pulses 102. Row discriminator 108 discriminates the row currently scanned on the code plate, in accordance with the output of Channel A, B, and C of said interval discriminator of broad width pulses 103, said narrow width pulse counter 104 and said broad width pulse counter 105. Gates 109 are controlled with the signals by said row discriminator, the same number *q* of such gates as the code plate rows being provided and each of the gates and connected in parallel to said shift register 107. Only the gate corresponding to the discriminated row will open and all the rest of the gates being closed. Reference numeral 110 designates a buffer register which is connected to said gates 109 and stores numeral information of one code plate.

In FIG. 10 (*b*) is shown the process timing chart for each part of the block diagram of FIG. 10 (*a*). First, suppose that a pulse series as shown by 111 of FIG. 10 (*b*) enters the discriminator of pulse width 101 through the amplifier as the output signal of the optical-to-electronic transducer 2.

This pulse series 111 is one that is obtained when the pattern of the 1st row from the left of the code plate shown in FIG. 4 (*a*) is scanned from bottom to top.

The discriminator of pulse width 102 measures by an integration circuit or counter, the time from the rising point to the falling point of each pulse — pulse width — and produces a signal in Channel 1 if the pulse width is greater than a given fixed threshold value $\tau_{BN}$ and in Channel 2 if it is less than the fixed threshold value $\tau_{BN}$. The signals generated in Channel 1 and Channel 2 are shown by 112 and 113 in FIG. 10 (*b*).

The interval discriminator of narrow width pulses 102 connected to said Channel 2, measures the interval of the signal 112 generated in Channel 2, i.e., interval of the narrow-width pulses, and selects binary code "1" if this interval is greater than a fixed threshold value $\tau_{1,0}$, and binary code "0" if it is smaller than the threshold value $\tau_{1,0}$, and supplies one after another the signals 114 of binary code "1" and "0" to the shift register 107. At the same time as this binary code is stored in the shift together, the 2 out of 5 check or parity check of the signal is done by the code check circuit 106.

The shift register 107 has a capacity to store the numeral information of one of the five rows arrayed horizontally, i.e., 10 bits, of the code plate pattern shown in FIG. 4 (*a*) for example.

The interval discriminator of broad width pulses 103 connected to said Channel 1, measures the interval of signal 113 generated in Channel 1, i.e., interval of broad width pulses, and provides a signal to Channel A if this interval is smaller than a given fixed threshold value $\tau_a$, to Channel B if it is greater than said threshold value $\tau_a$ but is smaller than another fixed threshold value $\tau_b$, and to Channel C if it is greater than said threshold value $\tau_b$. In the example of FIG. 10 (*b*), for $t_1 < \tau a$ , $\tau a < t < \tau b$, signals as shown by 115 are generated in both Channel A and Channel B for row I.

With the code plate shown in FIG. 4 (*a*), if Row II, Row III, Row IV and Row V scanned on signals generated in each of Channels A, B, and C in accordance with the relationship shown in Table 1.

Timing charts 116 and 117 show the operation of the narrow width pulse counter 104 and of the broad width pulse counter 105, respectively.

The function to discriminate the row being scanned at the moment belongs to the row discriminator 108. Overall judgement is made by the signals of said Channels A, B, and C and the outputs of the narrow width pulse counter 104 and the broad width pulse counter 105.

One method for the discrimination of a row is a method in which discrimination is made by the intervals between broad width pulses, there being in existence a relationship as shown in Table 1.

Another method for row discrimination is a method in which judgement is made by the number of narrow-width pulses coming before a broad width pulse, there being in existence a relationship as shown in Table 2.

In accordance with the discrimination of a row, one of the gates 109 for Rows I – V opens and the information in the shift register 107 is transferred to the corresponding buffer register 110.

As the light beam scans on the code plate from Row I to Row V, one after another, information is duly stored in the buffer register 110 in accordance with the procedure above-described. The buffer register has a capacity to store decimal numbers for one code plate — 10 figures in the case of FIG. 4 (*a*).

Information in the buffer register may be transferred to a central computer, printed or punched on tape at a terminal.

What is claimed is:

1. An optical electronic system for identification of objects moving along a predetermined route comprising, a code plate carried by each of said objects and composed of a plurality of vertical row arrays of retroreflective stripes of at least two predetermined different vertical widths arranged in accordance with predetermined alpha-numeric and row codes, light scanning means mounted wayside of said predetermined route and operable to vertically scan a light beam narrower than the narrowest of said vertical widths over said code plate repeatedly as said object moves therepast horizontally along said route to scan each of said vertical arrays of stripes and thereby produce a train of reflected light pulses, wayside transducer means operable to receive said light pulses and convert them to electric pulses, and data processing means operable to receive said electric pulses and decode the same by measuring the pulse widths and intervals.

2. The optical electronic system of claim 1 wherein said different vertical widths consist of narrow and wide, said alpha-numeric code being composed of a combination of interval variations between adjacent narrow stripes, and said row code being composed of a combination of positions of said broad stripes.

3. The optical electronic system of claim 2 wherein said narrow stripes are arranged in groups of a fixed number such that each group represents a character and said broad stripes arranged relative to said groups of narrow stripes.

4. The optical electronic systems of claim 3 wherein said fixed number of narrow stripes in each group is *m* and said narrow stripes are arranged such that a wide interval between adjacent stripes represents one binary number and a short interval therebetween represents the other binary number to provide $2^{(m-1)}$ binary combinations for character representation, each of said vertical row arrays having *p* units of said narrow stripe groups, a code plate having *q* units of vertical row arrays arranged horizontally and expressing *pxq* characters, and *n* units of said broad stripes included in each of said vertical arrays for horizontal discrimination of said *q* units of vertical arrays.

5. The optical electronic system of claim 4 wherein said *n* units of broad stripes are positioned relative to said *q* units of vertical arrays such that no two vertical arrays of the same code plate have the same broad stripe arrangement relative to said *q* units of vertical arrays.

6. The optical electronic system of claim 4 wherein *m* equals 6 and each of said narrow stripe groups is alpha-numeric coded by binary numbers in the rule 2 out of 5 code made by two broad and three narrow intervals among said six narrow stripes.

7. The optical electronic system of claim 1 wherein said light scanning means includes a cylindrical lens to focus said light beam into a long narrow image parallel to said stripes.

8. The optical electronic system of claim 1 wherein said light scanning means includes a convex lens which is inclined with respect to the axis of projection of the light beam to focus said light beam into a long narrow image parallel to said stripes.

9. The optical electronic system of claim 1 wherein said light scanning means includes a compound lens comprising a combination of a convex lens and a concave lens, at least one of which is inclined with respect to the axis of projection of the light beam.

10. The optical electronic system of claim 2 wherein said code plate is a base code plate common to all of said objects moving along said predetermined route with selected of said narrow stripes covered to provide said interval variations.

11. The optical electronic system of claim 2 wherein said data processing means is operative to discriminate said vertical row arrays by detecting the combination of the sequences and the intervals of said broad width electric pulses.

12. The optical electronic system of claim 2 wherein said data processing means is operative to discriminate said vertical row arrays by detecting the numbers and sequences of said narrow width electric pulses contained among said broad width electric pulses.

13. The optical electronic system of claim 2 wherein said data processing means is operative to discriminate said vertical row arrays by detecting the combination of the intervals of said broad width electric pulses and the number of narrow width electric pulses contained among said broad width electric pulses.

14. The optical electronic system of claim 1 wherein said data processing means consists of a pulse-amplifier which shapes an electric pulse series corresponding to the reflected light pulses produced from the stripes by vertically scanning the light beam over the stripes of said code plate, a discriminator circuit connected to the output of said pulse amplifier which measures the width of each individual pulse of said pulse series and discriminates broad-width pulses and narrow width pulses, a narrow width pulse discriminator circuit connected to the narrow width output of said discriminator circuit which measures the interval between adjacent narrow width pulses and judges it as binary code "1" or "0" on the basis of whether an interval exceeds or is less than a given threshold value, a shift register connected to output of said narrow width pulse discriminator circuit for the measurement of intervals between narrow width pulses and successive storage of the "1" and "0" binary signals, a broad width pulse discriminator circuit connected to the broad width output of said discriminator circuit which measures the interval between adjacent broad width pulses and judges whether the interval in relation to a given plurality of threshold values, a vertical array discriminating circuit connected to the output of said broad width pulse discriminator for measuring the intervals of the broad width pulses to discriminate the vertical row arrays in accordance with the judgment of time intervals of the broad width pulses, gate circuit means connected to the outputs of said shift register and said vertical row array discriminator and operable to pass the binary signals from each respectively different vertical array from said shift register through respectively different channels, and buffer registers respectively connected to said channels for separate storage of the information for each vertical array in a predetermined order.

15. A variable code plate for the identification of variable information for objects moving along a predetermined route comprising, a base code plate having a basic master code pattern of unicolor parallel retroreflective stripes common to all objects to be moved along a fixed route, and a removable mask covering selected of said retroreflective stripes in accordance with a predetermined code.

16. A variable code plate for the identification of variable information for objects moving along a predetermined route comprising, a series of parallel rotatable elongated members each having an axially extending retroreflective stripe thereon which may be each made visible and non-visible to one common direction of sight by rotating said members respectively, said members being rotated to selectively expose said retroreflective strips to said common direction of sight in accordance with a predetermined code.

* * * * *